(12) United States Patent
Blish et al.

(10) Patent No.: US 6,177,939 B1
(45) Date of Patent: *Jan. 23, 2001

(54) METHOD OF SAVING SECTIONS OF A DOCUMENT TO RANDOM ACCESS MEMORY

(75) Inventors: Nelson A. Blish, Rochester, NY (US); John M. Pratt, Atkinson, NH (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/168,812

(22) Filed: Oct. 8, 1998

(51) Int. Cl.[7] .................................................. G06F 17/00
(52) U.S. Cl. ........................................... 345/346; 345/342
(58) Field of Search ................................... 345/326–332, 345/340–348, 339, 352–357, 333, 145–146; 707/100, 102, 103, 104

(56) References Cited

U.S. PATENT DOCUMENTS

| 5,438,430 | | 8/1995 | Mackinlay et al. . |
| 5,487,141 | | 1/1996 | Cain et al. . |
| 5,502,557 | | 3/1996 | Mackinlay et al. . |
| 5,623,679 | * | 4/1997 | Rivette et al. ................... 707/522 X |
| 5,625,809 | | 4/1997 | Dysart et al. . |
| 5,666,214 | | 9/1997 | MacKinlay et al. . |
| 5,666,552 | * | 9/1997 | Greyson et al. ................ 345/157 X |
| 5,781,192 | * | 7/1998 | Kodimer .............................. 345/340 |
| 5,801,693 | * | 9/1998 | Bailey ................................. 345/339 |
| 5,809,318 | * | 9/1998 | Rivette et al. ....................... 707/501 |
| 5,897,650 | * | 4/1999 | Nakajima et al. ............... 345/348 X |
| 5,924,099 | * | 7/1999 | Guzak et al. ........................ 707/100 |
| 5,926,633 | * | 7/1999 | Takagi et al. ........................ 395/566 |
| 5,933,597 | * | 8/1999 | Hogan ............................ 395/200.34 |
| 5,964,834 | * | 10/1999 | Grutcher ............................. 709/213 |

* cited by examiner

*Primary Examiner*—Steven Sax
(74) *Attorney, Agent, or Firm*—Nelson Adrian Blish

(57) ABSTRACT

A method for saving sections of a document (10) to random access memory without overwriting previously saved sections is disclosed. The method comprises the steps of selecting a first section (18) of the document at a first location in the document. The first section is copied to a clipboard (30). A second section (19) of the document at a second location in the document is selected and copied to the clipboard (30) wherein the second section (19) does not overwrite said first section on the clipboard. These saved sections are subsequently pasted to other locations in the document or to other documents.

22 Claims, 4 Drawing Sheets

METHOD OF SAVING SECTIONS OF A DOCUMENT TO RANDOM ACCESS MEMORY

FIELD OF THE INVENTION

The invention relates in general to processing of information in a computer and in particular to a method of saving sections of a document to random access memory without overwriting information previously saved.

BACKGROUND OF THE INVENTION

In processing information on a computer it is often necessary to save a section of the on-screen document and reproduce it at another location in the document. This function is know as a "copy" operation, is useful and saves retyping sections of a document. The section copied may vary in length from a few words to entire paragraphs.

Another commonly available function is used to remove, or "cut" a section from a document. The cut section may then be pasted at another location in the document. This function also saves processing time by eliminating the need to delete sections of a document and then retype them at a different location in the document. In both the copy operation, and the cut operation, the information is temporarily saved to a "clipboard."

A limitation in both of these operations is that when a second section of the document is copied or cut, it overwrites the section currently saved on the clipboard. When a lengthy document is being revised it is often necessary to cut, copy, and paste different sections more than one time. If the section of the document on the clipboard is not what is needed at the current working location in the document, and a section that was previously copied to the clipboard is needed, the previously copied section will have to be found in the document, copied to the clipboard again, and then pasted in the appropriate section. If the section of the document that was previously on the clipboard, and which has now been overwritten, was cut from the document, it will have to be retyped.

A method of saving sections of a document to a clipboard without overwriting previously cut or copied sections is desirable.

SUMMARY OF THE INVENTION

An object of the present invention is to provide a method for saving sections of a document to random access memory without overwriting previously saved sections.

Another object of the invention is to provide a method for saving a first section of a first document to random access memory, and saving a first section of a second document to random access without overwriting previously saved sections The present invention is directed to overcoming one or more of the problems set forth above. Briefly summarized, according to one aspect of the present invention, a method for saving sections of a document to random access memory without overwriting previously saved sections, comprising the steps of selecting a first section of the document at a first location in the document. The first section is copied to a clipboard. A second section of the document at a second location in the document is selected and copied to the clipboard wherein the second section does not overwrite said first section on the clipboard. These saved sections are subsequently pasted to other locations in the document or to other documents.

These and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
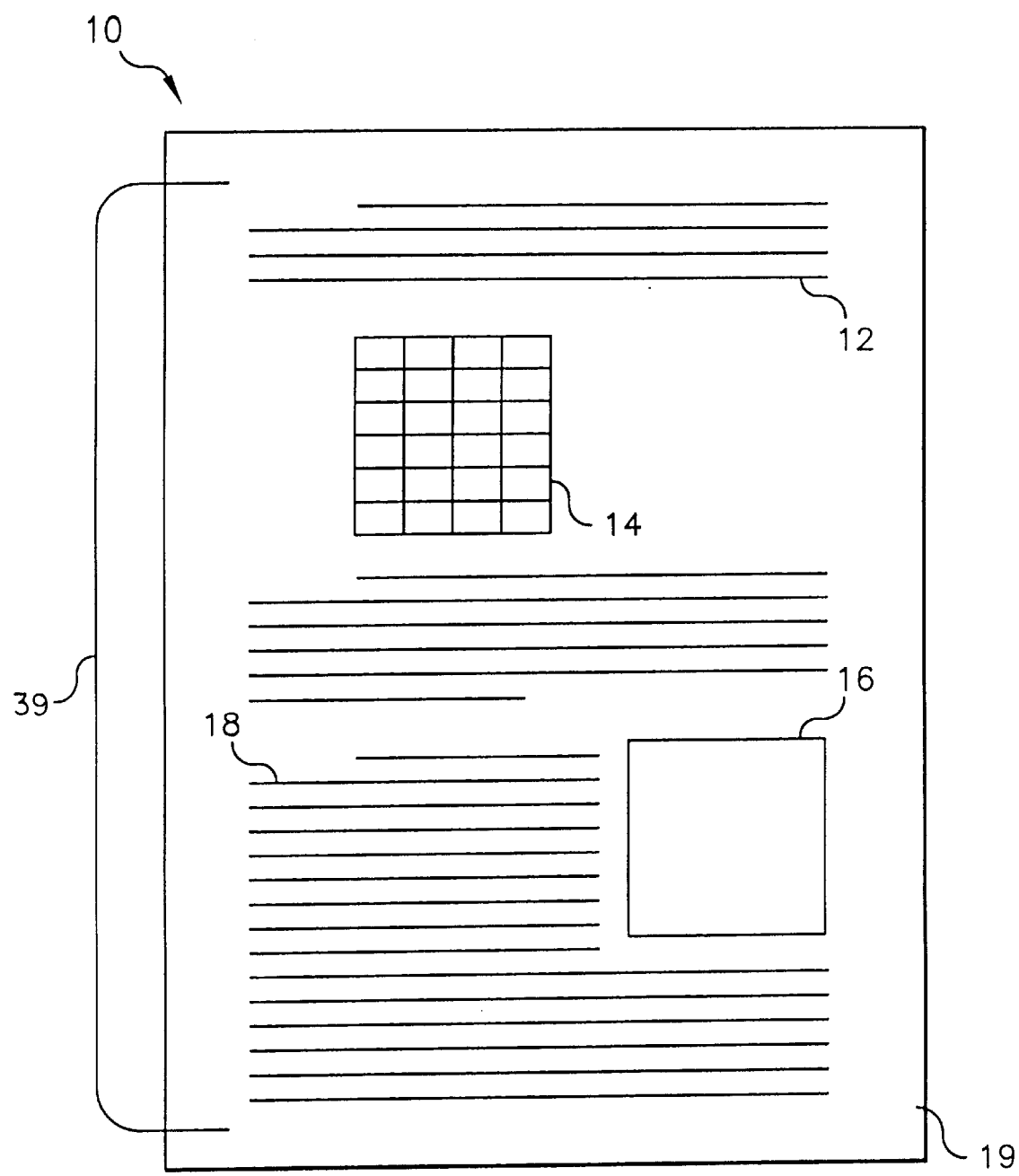
FIG. 1 is a schematic view of a document according to the present invention.

Referring to FIG. 1, a schematic view of a document 10 is shown. Document 10 is comprised of text 12, spread sheet 14, and image 16.

Figure 3:
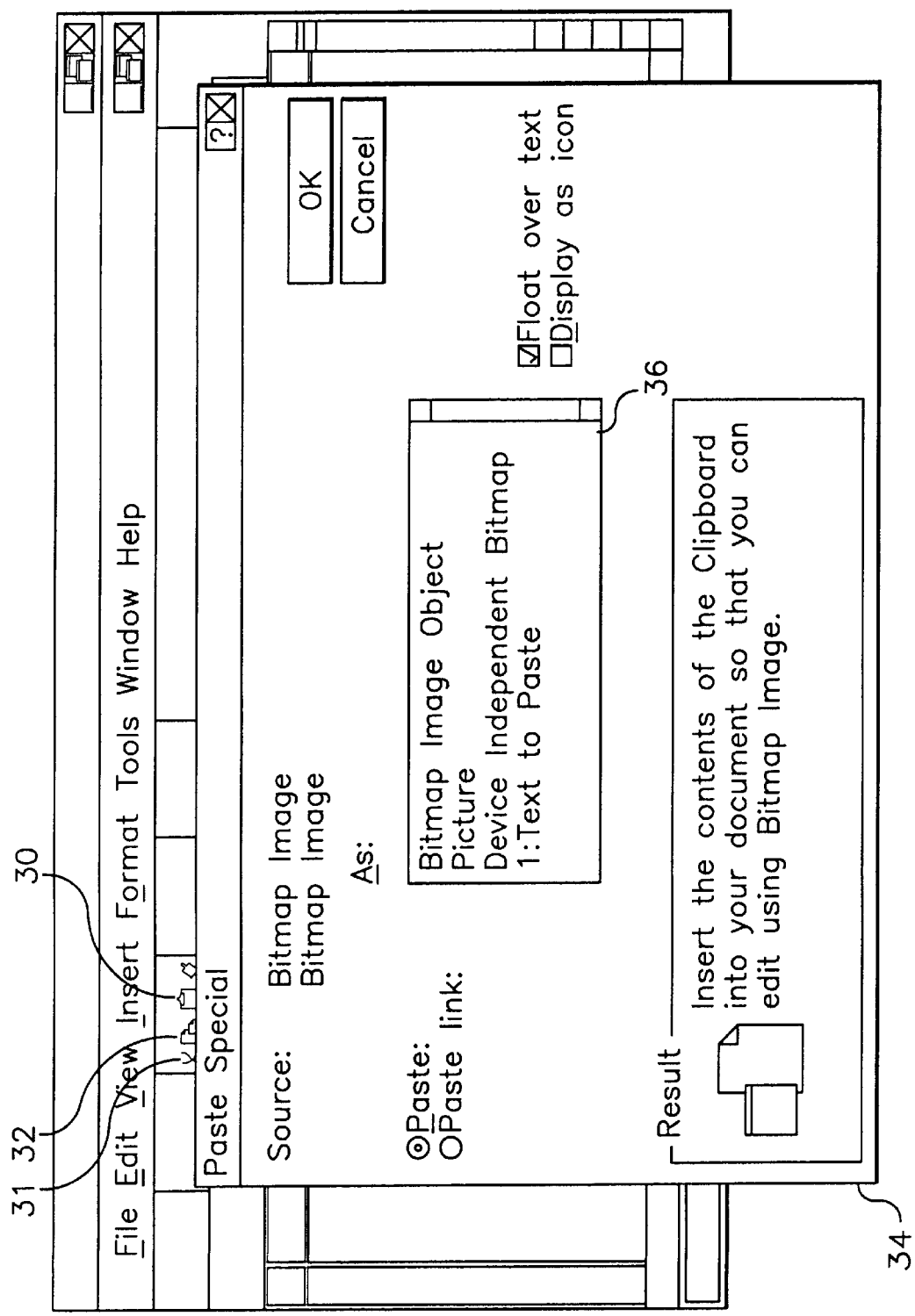
FIG. 3 is another schematic view a computer screen according to the present invention.

A clipboard 20, shown FIG. 3 as an icon, is the standard method of transferring data between a source and a destination in a Windows environment, a computer operating system sold by Microsoft Corporation. There are two clipboard mechanisms in Windows, the standard WIN3 clipboard API (Application Programming Interfaces), and OLE (Object Linking and Embedding) uniform data transfer (UDT) using Data Object and Data Sources.

When a data transfer is performed by using the clipboard, the data has a source and a destination. The source application provides the data for copying and the destination application accepts it for pasting. Applications on each side of the transfer must perform different operations on the same data for the transfer to succeed.

To transfer a section of a document to the clipboard, the section is selected. This is typically done by high lighting a section of text, first section 18, as shown in FIG. 1. Text images may be selected by using a pointing device, such as mouse, and dragging across the text with an appropriate mouse button depressed. Images may be selected by moving the on-screen pointer to the image and clicking the appropriated mouse button. The first section may be copied to the clipboard 30 by using the <edit>20, <copy>22, command, illustrated in FIG. 2, or the copy icon 32, illustrated in FIG. 3.

Currently, only one selection or cut/copy operation can be saved on the clipboard without overwriting sections previously saved. For example, if second section 19 is selected and copied, first section 18 is erased from the clipboard. To implement a method of saving sections of a document to the clipboard without overwriting previously cut/copy operations, a history of every cut/copy operation must be kept in a shared memory block. When a new cut/copy operation is made, the shared memory block will be accessed for every pre-existing cut/copy operation. The selected data will be rendered on the clipboard along with the current operation as single cut/copy operation but each of the previous operations will rendered as a different user-defined clipboard type. In one embodiment of the present invention, the following program components were used to implement a multiple cut and multiple copy feature, without overwriting previous sections saved to the clipboard.

1. Standard OLE Data Objects and Data Source

The Microsoft Foundation Class Library (MFC) provides three classes that represent each side of this transfer:

Data sources (as implemented by COleDataSource objects) represent the source side of the data transfer. They are created by the source application when data is to be copied to the clipboard, or when data is provided for a drag-and-drop operation.

Data objects (as implemented by COleDataObject objects) represent the destination side of the data transfer. They are created when the destination application has data dropped into it, or when it is asked to perform a paste operation from the clipboard.

COlePasteSpecialDialog class. The COlePasteSpecialDialog class is used for the OLE Paste Special 34 dialog box, shown in FIG. 3.

Figure 2:
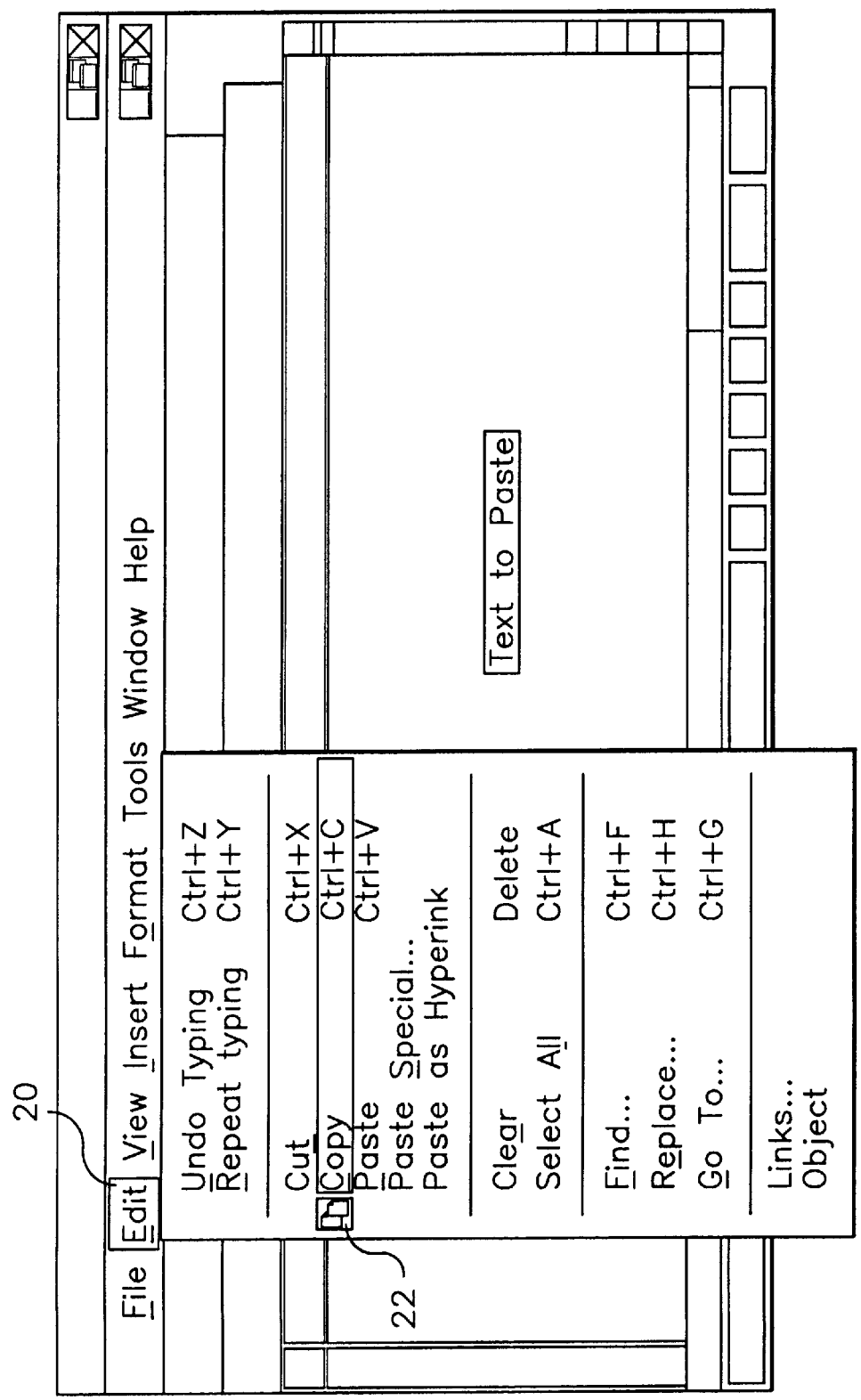
FIG. 2 is a schematic view a computer screen according to the present invention.

2. Shared Memory Blocks that contains a history of every copy/copy operation performed during the application session referred to as the Clipboard Table of Contents. And shared Memory Blocks that contains data from each cut and copy operation referred to as the Clipboard Data Memory block as illustrated in FIG. 2.

To copy or cut data on the clipboard the user selects the text. To put multiple selections on the clipboard the source application performs the following:

1. Register the selection as a new clipboard format using the RegisterClipboardFormat function and use its return value as the format ID. The name used in the RegisterClipboardFormat has the following format; N:<text> where n is a sequential number representing the number of times a cut or copy operation was selected, and <text> contains the first seventeen characters of the text selected or the word PICTURE if an image was selected. For example, if the text selected for copying was "Text to Paste" and this was the first time cut or copy was selected, the name would be "1:Text to Paste".

2. Create the Clipboard Table of Contents shared memory block (created on the first cut or copy, the name of the shared memory block is CLIPTOC) or append an entry for the cut or copy operation. The table of contents shared memory block contains three elements for each entry as follows:

ClipboardFormatName-The name of the specified in step 1. Length 20 Bytes

Format ID-The ID returned from RegisterClipboardFormat in Step 1. Length 4 Bytes ClipBoardFormat-The format of the data copied in the shared memory. For example if text was copied this entry would contain CF_TEXT.

3. Create the Clipboard Data Memory block that contains the selected data. The name of the Shared Memory block is the ClipboardFormatName as specified above.

| Clipboard Table of Contents - Name CLIPTOC | |
|---|---|
| Entry 1 | |
| 1:Text to Paste | (ClipboardFormatName) |
| 8001 | (User-defined clipboard format) |
| 0001 | (Actual Clipboard Format of Data - CF_TEXT) |

| -continued |
|---|
| Entry 2 |
| ... |
| Clipboard Data Memory Block - Name 1:Text to Paste |
| Clipboard Data |
| Text to Paste |

FIG. 2-Shared Memory for Clipboard Operations

4. Call COleDataSource::DelayRenderData repeatedly for every clipboard format in which data is supplied. Pass the clipboard format specified above and a FORMATETC structure describing the data. When the data is requested, the framework will call COleDataSource::OnRenderData, which must be overridden to read the clipboard table of contents shared memory block, find the format, open the shared memory named block that contains the data, retrieve and render it.

To paste date into the application, the Paste Special Menu 36 option is used as illustrated in FIG. 3, which is used to paste OLE data using the OLE uniform data transfer (UDT), Data Objects, and Data Sources.

To display the Paste Special Dialog Box, create an object of class COlePasteSpecialDialog. After a COlePasteSpecialDialog object has been constructed, AddFormat method is used to add clipboard formats from the Clipboard Table of Contents shared memory block to the dialog box. Call this function to add the new formats created from the source application as specified above to the list of formats your application can support in a Paste Special operation. To add the formats created above access the table of contents shared memory block to get the name and clipboard type.

Before an application allows the user to paste data into it, all of the formats (renditions) on the clipboard must be specified. To do this the application performs the following:

1. Create a COleDataObject object and a FORMATETC structure.

2. Call the data object's AttachClipboard member function to associate the data object with the data on the clipboard.

3. Call the data object's BeginEnumFormats member function to start enumerating the formats available on the clipboard. Then call GetNextFormat to get all of the formats/renditions on the clipboard.

4. Call COleDataObject::GetData to get the selected format

Figure 4:
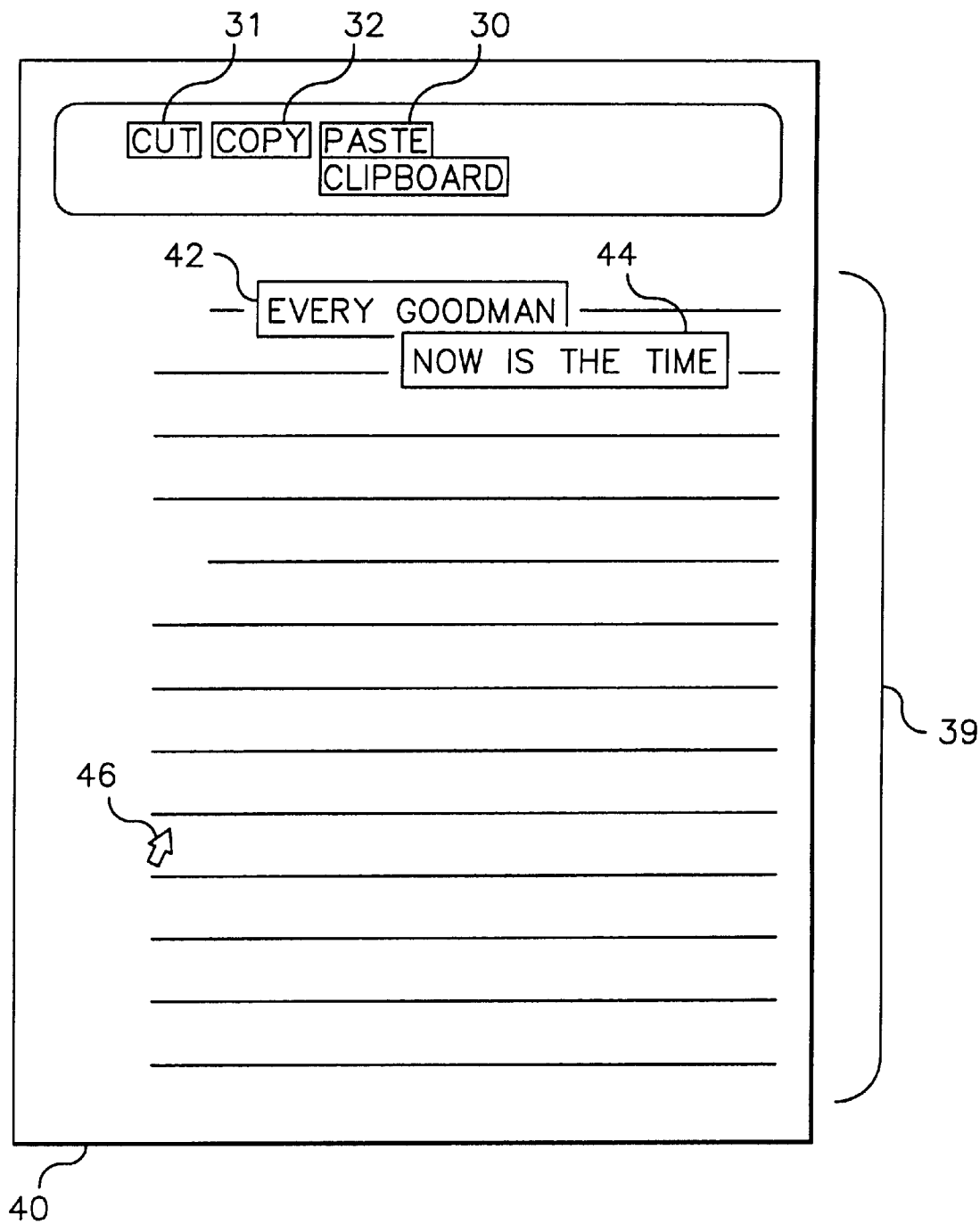
FIG. 4 is a schematic view of a computer screen according to the present inventor showing saved sections as thumbnails.

In operation according to one embodiment of the invention shown in FIG. 4, a document 39 is shown on screen of monitor 40. A section of the document 39 has been highlighted as described above and copied by clicking on the copy icon 32 to temporarily store the copied section in the computer clipboard 30. In this embodiment the copied section is represented by an on-screen thumbnail 42 providing the first few words of the section copied. A second section of the document is highlighted and cut or removed from the document by clicking on the cut icon 31. This information is represented by an onscreen thumbnail showing the first few words of the section cut from the document as thumbnail 44. An onscreen pointer 46 is moved to a location in document 39 where text on the clipboard is to be saved. The pointer 46 is clicked at this location to establish the cursor at this document location. Onscreen pointer 46 is then moved to the appropriate thumbnail 42 or 44 and clicked on that thumbnail to add text at the appropriate location.

The invention has been described in detail with particular reference to certain preferred embodiments thereof, but it will be understood that variations and modifications can be effected within the spirit and scope of the invention. For example, even though the invention has been described with reference to a typewritten document, those skilled in the art will understand that document as claimed in the invention applies to images, spread sheets, databases, and other types of information handled by computers.

| PARTS LIST | |
|---|---|
| 10 | Document |
| 12 | Text |
| 14 | Spread Sheet |
| 16 | Image |
| 18 | First Section |
| 19 | Second Section |
| 20 | <edit> |
| 22 | <copy> |
| 30 | Clipboard/Paste |
| 32 | Copy Icon |
| 33 | Cut Icon |
| 34 | Paste Special |
| 36 | Paste Special Menu |
| 39 | Document |
| 40 | Monitor |
| 42 | Thumbnail |
| 44 | Thumbnail |
| 46 | Pointer |

What is claimed is:

1. A method for saving sections of a document to random access memory without overwriting previously saved sections comprising the steps of:

selecting a first section of said document at a first location in said document;

copying said first section to a clipboard;

selecting a second section of said document at a second location in said document;

copying said second section of said document to said clipboard;

wherein said second section does not overwrite said first section on said clipboard;

wherein said first section and said second section are copied in one step operations; and pasting said first section and only said first section to a third location in said document while retaining said second section on said clipboard.

2. A method as in claim 1 comprising the additional step of pasting said second section to a fourth location in said document.

3. A method for saving sections of a document to random access memory without overwriting previously saved sections comprising the steps of:

selecting a first section of said document at a first location in said document;

copying said first section to a clipboard;

selecting a second section of said document at a second location in said document;

copying said second section of said document to said clipboard;

wherein said second section does not overwrite said first section on said clipboard;

wherein said first section and said second section are copied in one step operations; and pasting said second section to a third location in said document while retaining said first section on said clipboard.

4. A method as in claim 1 wherein said first section is saved as a thumbnail icon on-screen; and wherein said thumbnail icon displays at least a portion of information contained in said first section.

5. A method as in claim 4 wherein said second section is saved as a thumbnail icon on-screen; and wherein said thumbnail icon displays at least a portion of information contained in said second section.

6. A method as in claim 1 comprising the additional steps of:

selecting a third section of said document at a third location in said document;

cutting said third section of said document to said clipboard; and wherein said third section does not overwrite said first section or said second section on said clipboard.

7. A method as in claim 6 comprising the additional step of pasting said first section to a fourth location in said document.

8. A method as in claim 7 comprising the additional step of pasting said second section to a fifth location in said document.

9. A method as in claim 8 comprising the additional step of pasting said third section to a sixth location in said document.

10. A method as in claim 6 wherein said third section is saved as a thumbnail icon on-screen; and wherein said thumbnail icon displays at least a portion of information contained in said third section.

11. A method for saving sections of a document to random access memory comprising the steps of:

selecting a first section of said document at a first location in said document;

copying said first section to a clipboard;

selecting a second section of said document at a second location in said document;

cutting said second section of said document to said clipboard;

wherein said second section does not overwrite said first section on said clipboard;

wherein said first section and said second section are copied and cut respectively in one step operations; and pasting said first section to a third location in said document while retaining said second section on said clipboard.

12. A method as in claim 11 comprising the additional step of pasting said second section to a fourth location in said document.

13. A method for saving sections of a document to random access memory comprising the steps of:

selecting a first section of said document at a first location in said document;

copying said first section to a clipboard;

selecting a second section of said document at a second location in said document;

cutting said second section of said document to said clipboard;

wherein said second section does not overwrite said first section on said clipboard;

wherein said first section and said second section are copied and cut respectively in one step operations; and pasting said second section to a third location in said document while retaining said first section on said clipboard.

14. A method as in claim 11 wherein said first section is saved as a thumbnail icon on-screen; and wherein said thumbnail icon displays at least a portion of information contained in said first section.

15. A method as in claim 14 wherein said second section is saved as a thumbnail icon on-screen; and wherein said thumbnail icon displays at least a portion of information contained in said second section.

16. A method for saving sections of a document to random access memory comprising the steps of:

selecting a first section of said document at a first location in said document;

cutting said first section to a clipboard;

selecting a second section of said document at a second location in said document;

copying said second section of said document to said clipboard;

wherein said second section does not overwrite said first section on said clipboard;

wherein said first section and said second section are cut and copied respectively in one step operations; and pasting said first section to a third location in said document while retaining said second section on said clipboard.

17. A method as in clam 16 comprising the additional step of pasting said second section to a fourth location in said document.

18. A method for saving sections of a document to random access memory comprising the steps of:

selecting a fist section of said document at a first location in said document;

cutting said first section to a clipboard;

selecting a second section of said document at a second location in said document;

copying said second section of said document to said clipboard;

wherein said second section does not overwrite said first section on said clipboard;

wherein said first section and said second section are cut and copied respectively in one step operations; and pasting said second section to a third location in said document while retaining said first section on said clipboard.

19. A method as in claim 16 wherein said first section is saved as a thumbnail icon on-screen; and wherein said thumbnail icon displays at least a portion of information contained in said first section.

20. A method as in claim 19 wherein said second section is saved as a thumbnail icon on-screen; and wherein said thumbnail icon displays at least a portion of information contained in said second section.

21. A method for saving sections of documents to random access memory comprising the steps of:

selecting a first section of a first document at a first location in said first document;

copying said first section of said first document to a clipboard;

selecting a first section of a second document at a first location in said second document;

copying said first section of said second document to said clipboard;

wherein said first section of said second document does not overwrite said first section of said first document on said clipboard;

wherein said first section and said second section are copied in one step operations; and wherein said first section and said second section may be pasted independently.

22. A method for saving sections of documents to random access memory comprising the steps of:

selecting a first section of a first document at a first location in said first document;

cutting said first section of said first document to a clipboard;

selecting a first section of a second document at a first location in said second document;

copying said first section of said second document to said clipboard;

wherein said first section of said second document does not overwrite said first section of said first document on said clipboard;

wherein said first section and said second section are cut and copied respectively in one step operations; and wherein said first section and said second section may be pasted independently.

* * * * *